United States Patent [19]

Hagan

[11] Patent Number: 4,615,213
[45] Date of Patent: Oct. 7, 1986

[54] PRESSURE SENSING INSTRUMENT FOR AIRCRAFT

[75] Inventor: Floyd W. Hagen, Eden Prairie,

[73] Assignee: Rosemount Inc., Eden Prairie, Minn.

[21] Appl. No.: 564,520

[22] Filed: Dec. 22, 1983

[51] Int. Cl.⁴ ............................................. G01C 21/00
[52] U.S. Cl. ..................................................... 73/180
[58] Field of Search ............ 73/180, 182, 183, 861.65, 73/861.67, 861.68, 861.66, 178 R

[56] References Cited

U.S. PATENT DOCUMENTS

| | | | |
|---|---|---|---|
| 2,237,306 | 9/1939 | Hood | 73/180 |
| 2,660,056 | 11/1953 | Schuck et al. | 73/180 |
| 2,923,152 | 2/1960 | Mabry, Jr. et al. | 73/180 |
| 3,094,868 | 9/1960 | Andersen, Jr. et al. | 73/178 |
| 3,318,146 | 5/1967 | De Leo et al. | 73/180 |
| 4,378,696 | 4/1983 | De Leo et al. | 73/180 |

OTHER PUBLICATIONS

WADC Technical Report 54-267, Wright Air Development Center, "Study of Systems for True Angle of Attack Measurement", May, 1955, F. M. Emerson, F. H. Gardner, G. D. Gruenwald, R. Olshausen, L. V. Sloma.

*Primary Examiner*—Donald O. Woodiel
*Attorney, Agent, or Firm*—Kinney & Lange

[57] ABSTRACT

The invention comprises an improved sensing instrument (10) for sensing the angular position of the longitudinal axis (17) of a cylindrical sensor body (14) of an object moving relative to a fluid medium with respect to a first plane. Such object has a leading end portion (15) joined to the sensor body (14) and exposed to the fluid medium. A first pair of pressure sensing ports (20 and 21) are on the object and face in the upstream direction and have their axes lying in a second plane at right angles to said first plane and disposed at predetermined angles with respect to the axis (17) of the object. A second pair of pressure sensing ports (22 and 23) on the object have their axes lying in the first plane, such axes being disposed at predetermined angles with respect to the axis (17) of the object. A single pressure port (16) on the object has an axis coinciding with the axis (17) of the object. The improvement comprises the leading end portion (15) of the sensor body (14) defining a spherical segment of one base.

7 Claims, 6 Drawing Figures

PRESSURE SENSING INSTRUMENT FOR AIRCRAFT

BACKGROUND OF THE INVENTION

1. Field of the Invention

The present invention relates to an improved sensing instrument which utilizes pressure measurements during aircraft flight to determine the Mach number, flight angles, impact pressure, and static pressure with only one head protruding from the aircraft.

2. Prior Art

A pressure sensing instrument for aircraft is disclosed in U.S. Pat. No. 3,318,146, held by the same assignee. A device made according to the present invention is an improvement on the sensor disclosed in such patent. The device made according to the present invention exhibits marked improvements including an improvement in linearity wherein the output signal of the sensor is shown to agree very closely with the true angle of attack. A second significant improvement is that the present device is less sensitive to changes in Mach number of flow past the sensor. This is particularly true under conditions of subsonic flow.

DETAILED DESCRIPTION OF THE PREFERRED EMBODIMENT

Figure 1:
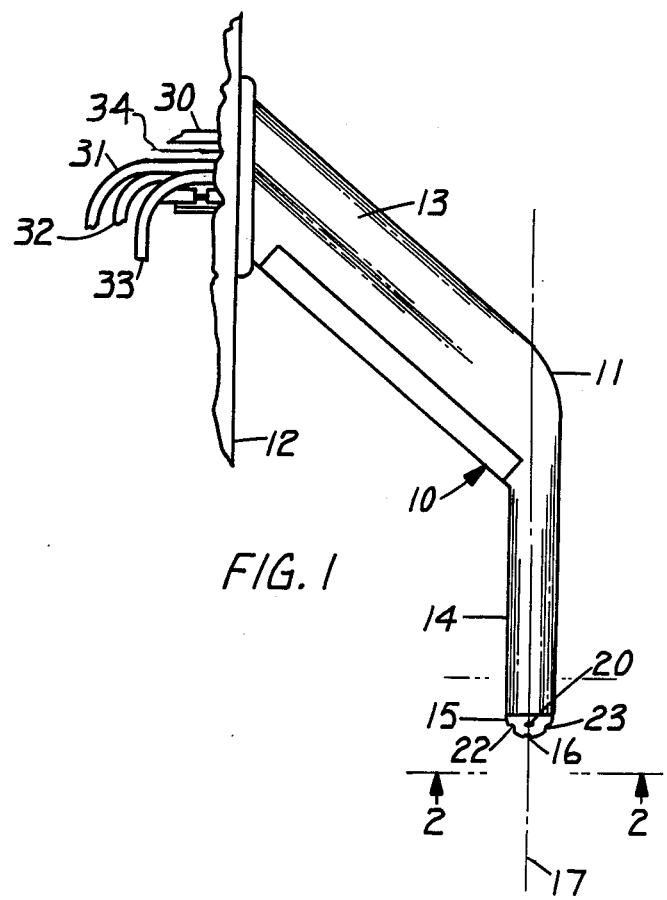
FIG. 1 is a plan view of a sensor made according to the present invention and designed for mounting onto the fuselage of an aircraft.
Figure 2:
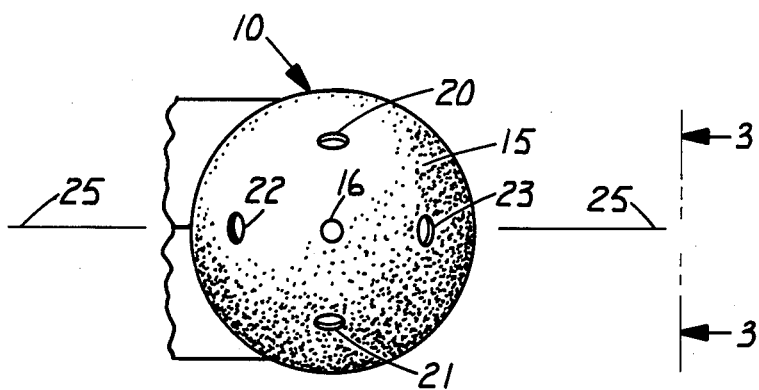
FIG. 2 is a fragmentary enlarged end view of the end portion of the sensor taken as on line 2—2 in FIG. 1.

Referring to FIGS. 1 and 2 and the numerals of reference thereon, a sensor illustrated generally at 10 includes a probe 11 which is attached to an aircraft 12 and protrudes out into the air stream. The probe 11 has a suitable first support section 13 and a sensor body 14 comprising a cylindrical tube having an external surface about a central longitudinal axis 17, which longitudinal axis 17 is aligned with the axis of the aircraft in a predetermined relation.

Figure 3:
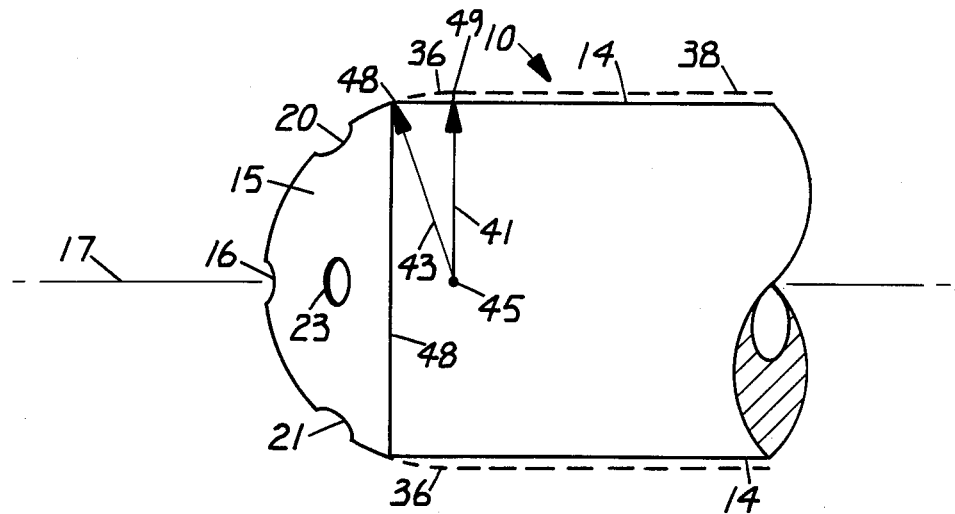
FIG. 3 is a fragmentary enlarged side view of the end portion of the sensor and adjacent portion of the sensor body taken as on Line 3—3 in FIG. 2 and including the addition of the prior art device shown by dashed lines.

End portion 15 of sensor body 14 comprises a part spherical surface defining a spherical section of one base having five ports thereon. As shown, leading end portion 15 has an axial port 16 in the center leading edge position on the extension of the central longitudinal axis 17 of sensor body 14. Longitudinal axis 17 is shown in FIGS. 1 and 3. End portion 15 has four other ports which are equally spaced in surrounding position with respect to axial port 16. Included are a first port 20 and a second port 21, both of which have their axes lying in a common plane, which plane passes through the longitudinal axis 17 of sensor body 14 and is vertical during straight and level flight. In addition, the axes of first and second ports 20 and 21 are preferably inclined at substantially 45 degrees from the longitudinal axis 17 of sensor body 14. The location of ports 20 and 21 has been found to be suitable between 35 and 55 degrees with respect to the longitudinal axis 17 of sensor body 14.

In addition, a third port 22 and a fourth port 23 are provided on end portion 15 and have their axes lying in a plane, which plane passes through the longitudinal axis 17 of sensor body 14 and perpendicular to the plane of the axes of ports 20 and 21. During straight and level flight, the sensor is oriented on aircraft such that the axes of ports 22 and 23 lie in the horizontal plane indicated at 25. The axes of ports 22 and 23 are also inclined at 45 degrees from the longitudinal axis of the sensor body 14 and these ports could likewise be positioned anywhere between 35 and 55 degrees with respect to the latter.

As shown, each of the ports are connected to a separate conduit. For example, port 20 is connected to a conduit 30, port 21 is connected to a conduit 31, port 22 is connected to a conduit 32, port 23 is connected to a conduit 33, and port 16 is connected to a conduit 34. These conduits open to their respective ports and extend through the sensor body 14 and the support section 13. The conduits can be supported on bulkheads or in any other suitable manner.

Assuming straight and level flight, it can be seen that the pressure at port 16 will be the total pressure, equal to the normal Pitot or stagnation pressure of an aircraft. The pressures at ports 20, 21, 22 and 23 will all be equal and more negative than the pressure at port 16 since they are situated downstream from the stagnation point. Now, if the angle of attack changes, a pressure differential occurs between ports 20 and 21, and the magnitude of this differential depends upon the amount of change in the angle of attack. Whether the differential is positive or negative would, of course, depend upon whether the change in the angle of attack is positive or negative. Likewise, if there is any sideslip, a pressure differential occurs between ports 22 and 23, and the measure of this differential is used in determining the angle of sideslip.

FIG. 3 illustrates the difference between a device made according to the instant invention and the prior art device. FIG. 3 is a side view of a portion of the device shown in FIG. 2 as taken from the right side of FIG. 2. Numbers in FIG. 3 identify the same components of the device as corresponding numbers in FIG. 2. The prior art device is shown by dashed lines superimposed on the present device. End portion 15 comprises a spherical segment of one base. Point of transition 48 between end portion 15 and sensor body 14 defines a circle lying in a plane perpendicular to the longitudinal axis 17 of sensor body 14. Center point 45 of the spherical segment defining end portion 15 is rearward of the plane of the point of transition 48. The end portion of the prior art device comprises a full hemisphere as shown by dashed lines 36. In the prior art device, the radius of the sensor body was equal to the radius of the end portion. The prior art sensor body is shown by dashed lines 38. Since the two radii were equal, there was a smooth transition at the point 49 where the end portion joined the sensor body, the sensor body being tangential to the end portion at the point 49 of joining.

Figure 4:
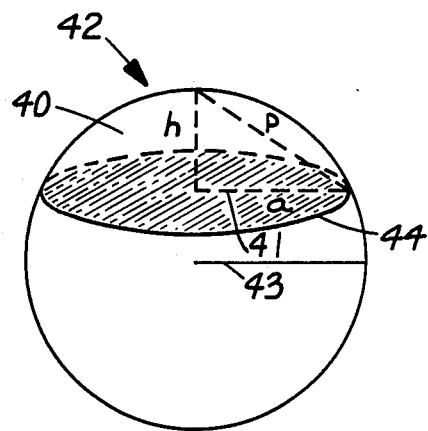
FIG. 4 is a drawing of a spherical segment of one base.

As indicated above, end portion 15 of a device made according to the present invention comprises a spherical segment of one base. Such segment 40 is a part spherical surface and is depicted in FIG. 4. Segment 40 is the lesser of the two portions of sphere 42 that results from passing a plane through small circle 44 inscribed on the surface of sphere 42. As defined herein, the length of dimension 41, noted also as dimension "a", is in all embodiments less than the radius 43 of sphere 42. It follows that twice dimension 41 is less than the diameter of sphere 42 and that the surface of segment 40 is less than the surface of a hemisphere of sphere 42. The surface area of segment 40 is determined by the formulas $S = 2\pi Rh = \pi p^2$, where S equals surface area, R equals the radius of sphere 42 and the dimensions h and p are as shown in FIG. 4.

In the present application, dimension 41 equals the radius of sensor body 14, shown also as dimension 41 in FIG. 3. Since dimension 41 is less than the radius of sphere 42, shown as dimension 43 in FIG. 3, the point of transition 48 between end portion 15 and sensor body 14 is a locus of points defining a circle and transition 48 is sharp, unlike the smooth transition of the prior art device, shown at point 49. It is the sharp transition that results in the improved performance of a device made according to the present invention. It has been shown that such improved performance results where the radius of sensor body 14 is between 0.02 percent and 20 percent less than the radius of end portion 15.

Figure 5:
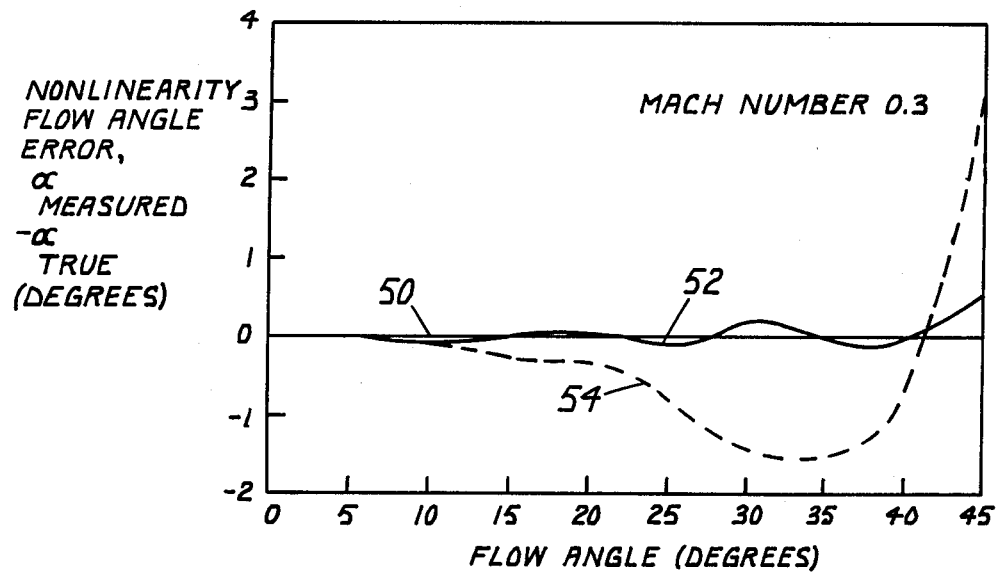
FIG. 5 is a graph of nonlinearity flow angle error versus flow angle relative to the sensor in degrees comparing the '146 device and a device made according to the present invention.
Figure 6:
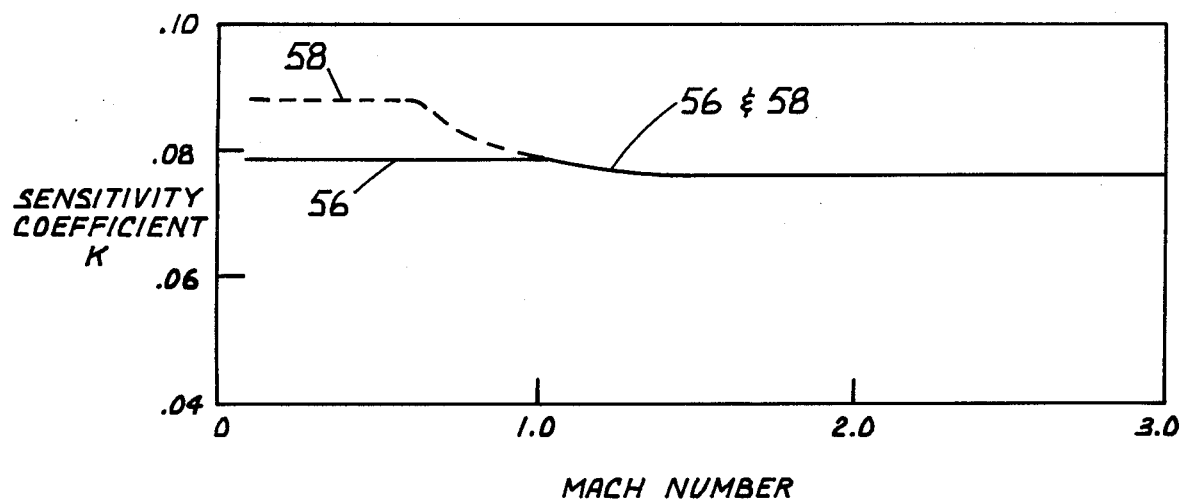
FIG. 6 is a graph of sensitivity coefficient versus Mach number comparing the '146 device and a device made according to the present invention.

The improvement in performance is graphically illustrated in FIGS. 5 and 6. The theoretically perfect instrument is one that is absolutely linear or in other words, the measured parameter is identical to the true parameter. While such theoretical linearity is rarely achieved, how closely an instrument approaches linearity is a measurement of its utility. If the instrument's deviation from linearity is within the error tolerance for a specific application, the instrument may then be utilized without corrections. Where the instrument's nonlinearity is greater than that permitted by the error tolerance, the closer that the instrument is to being linear, the simpler are the corrections that must be applied to permit utilization of the instrument in the particular application. The theoretically linear instrument is shown in FIG. 5 as the true flow angle, line 50. The measured flow angles of an instrument made according to the present invention are shown by curve 52 and the measured flow angles of the prior art device are shown by dashed curve 54.

It can be seen that the present device, curve 52, closely approximates the true flow angle, line 50. The present device is dramatically better than the prior art device, curve 54, at the higher angles of attack. Modern military fixed wing aircraft frequently operate at high angles of attack in order to enhance their ability to quickly change direction. Such maneuvers may be critical to survival in a combat environment yet, such maneuvers are not without risk. The high angle of attack maneuvers place the aircraft close to the point of stall. Stall in a modern high performance jet aircraft is always critical since the aerodynamics of the aircraft may not permit recovery from a spin induced by the stall. Accordingly, a device made according to the present invention provides the pilot a very accurate indication, of angle of attack especially at the critical high angles of attack, thereby significantly contributing to flight safety.

FIG. 6 illustrates the Mach effects on both a device made according to the present invention, shown by curve 56, and a prior art device, shown by dashed curve 58. In FIG. 6 the theoretically perfect device is a sensitivity coefficient that is linear and does not vary as a function of Mach number. In the past, the greatest nonlinearity has occurred in the transonic region approaching Mach 1.0, with somewhat lesser nonlinearities occurring as Mach 1.0 is exceeded. Such nonlinearity, which frequently affects air data sensors, results from compressibility effects and the onset of shock wave formation as Mach 1.0 is approached. A device made according to the present invention is seen to be highly linear throughout a wide range of Mach numbers, including the critical transonic region, where only a slight nonlinearity exists. FIG. 6 shows the sensitivy coefficient, K, plotted against Mach number. The sensitivity coefficient is really a calibration constant used in the conversion of the various pressures sensed at the device to angle of attack, $\alpha$, expressed in degrees. The relationship is normally expressed as $$\alpha = \frac{P_{21} - P_{20}}{K\left[(P_{16} - P_{22}) + \frac{(P_{22} - P_{23})}{2}\right]} \text{ Accordingly}$$

$$K = \frac{P_{21} - P_{20}}{\alpha\left[(P_{16} - P_{22}) + \frac{P_{22} - P_{23}}{2}\right]} \text{ where}$$

the various pressures, P, are the pressures sensed at the port shown in FIG. 2 with same number as the suffix of the specific pressure. That is, for example, $P_{21}$ is the pressure sensed at second port 21. The near linearity of the present device can be seen from curve 56. It should be noted that in excess of Mach 1.0, curve 56 and curve 58 are coincident.

With this sensor we have five pressure measurements. The pressure at port 16 of $P_T$; and the pressures at ports 20, 21, 22 and 23. From these measurements the angle of attack, the angle of sideslip, the total pressure, the Mach number and the static pressure can be derived.

It has been found through analysis and experimentation that the Mach number of the airplane (Mach number is the ratio of the speed of the aircraft to the speed of sound in the fluid medium) is a function of the average pressure between the ports 22 and 23 ($P_4$) divided by the stagnation pressure at port 16 ($P_T$). It has also been found experimentally that this holds true across a wide range of Mach values. The derived curves shown in FIG. 6 represent substantially straight line functions, but vary in slope between three ranges of Mach values, namely, from 0.2 to about 0.8, from 0.8 to 1.1, and from 1.1 and over. Therefore, knowing the pressure ratio of $P_4/P_T$, means is provided for determining the Mach number of the aircraft.

In addition, it has been found experimentally that the difference in pressure between ports 20 and 21 ($P_1-P_2$) divided by the difference in pressure between port 16 ($P_T$) and the average pressure at ports 22 and 23 ($P_T-P_4$) is a substantially linear function of the flow angle. Likewise, if the angle of sideslip is desired it can be determined by the ratio of the pressure differential between ports 22 and 23 ($P_1$ and $P_2$) divided by the difference in pressure between port 16 ($P_T$) and the average pressure at ports 20 and 21 ($P_4'$). Accordingly, means is provided for determining both the angle of attack and the angle of sideslip.

What is claimed is:

1. An improved sensing instrument for sensing the angular position of the longitudinal axis of a cylindrical sensor body of an object moving relative to a fluid medium with respect to a first plane, said object having a leading end portion joined to the sensor body and exposed to the fluid medium, a first pair of pressure sensing ports on the object and facing in upstream direction, said first pair of ports having their axes lying in a second plane at right angles to said first plane and disposed at predetermined angles with respect to the axis of said object, a second pair of pressure sensing ports having their axes lying in said first plane, the axes of said second pair of ports being disposed at predetermined angles with respect to the axis of said object, a single pressure port having an axis coinciding with the axis of the object wherein the improvement comprises the leading end portion of the sensor body defining a spherical segment of one base.

2. An improved sensing instrument as described in claim 1 wherein a locus of points of transition exists where the leading end of the sensor body joins the sensor body, which locus defines a circle and such locus comprises a sharp corner between the leading end and the sensor body.

3. An air data sensing probe comprising a cylindrical tube having a central longitudinal axis, and an outer surface generated about said axis;

an end portion formed on said tube, said end portion having a part spherical outer surface generated about a center point lying on the axis and having a radius larger than the radius of the cylindrical tube, the part spherical outer surface comprising a part spherical surface less than a hemispherical surface;

the cylindrical outer surface of the tube and the part spherical surface of the closed end member intersecting on a plane having a diameter less than the diameter of the hemispherical surface of which the part spherical surface comprises a portion to thereby form an abrupt transition from the part spherical surface to the cylindrical surface; and port means defined through said part spherical surface and adapted to sense desired fluid pressures at said spherical surface.

4. The probe of claim 3 wherein the radius of the outer cylindrical surface of said probe tube ranges between 0.02 percent and 20 percent less than the radius of the part spherical surface.

5. An air data sensing probe comprising a circular cylindrical tube portion having a central longitudinal axis, said tube having an outer surface generated about said axis at a first radius;

said tube having a leading end which has an outer part spherical surface generated about a center point lying on said axis;

the cylindrical surface terminating along a plane perpendicular to said axis, and the center point of said spherical surface being positioned rearwardly of said plane with respect to the leading end of said probe; and at least one pair of air data sensing port means defined in said part spherical surface and opening into the interior of said tube, said port means having central axes forming acute angles with respect to the longitudinal axis of said tube.

6. The probe of claim 5 wherein there are five port means formed through the part spherical surface, said port means comprising a second pair of port means having axes forming acute angles in equal and opposite directions with respect to the longitudinal axis, and being annularly offset from the first set of port means, and central port means having an axis substantially coincidential with the longitudinal axis of said tube.

7. An improved sensing instrument for sensing the angular position of an axis of an object moving relative to a fluid medium with respect to a first plane, said object having a leading end exposed to the fluid medium, a first pair of pressure sensing ports on the object and facing in upstream direction, said first pair of ports having their axes lying in a second plane at right angles to said first plane and disposed at predetermined angles with respect to the axis of said object, a second pair of pressure sensing ports having their axes lying in said first plane, the axes of said second pair of ports being disposed at predetermined angles with respect to the axis of said object, a single pressure port having an axis coinciding with the axis of the object, and means to receive pressure signals from said ports and provide a separate signal according to the formula $$\frac{P_1 - P_2}{P_T - P_4}$$

where $P_1$ and $P_2$ are pressures at each of the first pair of ports respectively, $P_4$ is the average pressure at the second pair of ports and $P_T$ is the pressure at said single port, wherein the improvement comprises the leading end portion of the object having an outer surface defining a spherical segment less than a hemisphere and the geometric center of the part spherical surface lying on the object axis, the part spherical segment being centered on the object axis.

* * * * *

UNITED STATES PATENT AND TRADEMARK OFFICE
CERTIFICATE OF CORRECTION

PATENT NO. : 4,615,213
DATED : October 7, 1986
INVENTOR(S) : Floyd W. Hagen

It is certified that error appears in the above-identified patent and that said Letters Patent is hereby corrected as shown below:

On the title page,

Item [19] please change the name "Hagan" to read

-- Hagen --.

Signed and Sealed this

Tenth Day of February, 1987

Attest:

DONALD J. QUIGG

Attesting Officer

Commissioner of Patents and Trademarks